Aug. 8, 1944. H. TESTO 2,355,124
ENDLESS-BAND TOOL
Filed Dec. 23, 1941

INVENTOR.
HENRY TESTO
BY
ATTORNEY.

Patented Aug. 8, 1944

2,355,124

UNITED STATES PATENT OFFICE 2,355,124

ENDLESS-BAND TOOL

Henry Testo, Lakewood, Ohio, assignor of one-half to Curt B. Muller, Cleveland, Ohio Application December 23, 1941, Serial No. 424,199

8 Claims. (Cl. 29—103)

My invention pertains to an endless band tool. More particularly, the drawing exemplifies the principles of my redesign and adaptation to be incorporated either in an endless band having linear file teeth along a side or in the coactive combination therewith of saw teeth along an edge to provide an integral band saw and band file structure, the latter as a dual-acting tool adapted simultaneously to perform two different machining operations. In operation, the sawing operation commences to be soon succeeded and thereafter accompanied by a shearing abrasion of one of the consequent appositioned surfaces which define the kerf.

One object has been to expedite and cheapen the procedure of making a new finished edge surface on a blank while employing a single, flexible band whereby to lessen material cost, labor-time and operation-time in comparison with the separate saw and file bands hitherto made, sold and used.

Other objects of my invention have been: a saving in initial tool cost, a saving of labor-hours both during machine set-up and adjustments and because of greater speed of performance of two different machining operations, consequent to the simultaneous formation of saw teeth and file teeth on a band and likewise consequent to the simultaneous performance of both distinct machining operations with guided compound relative movement effected between the tool and work piece.

Figure 1:
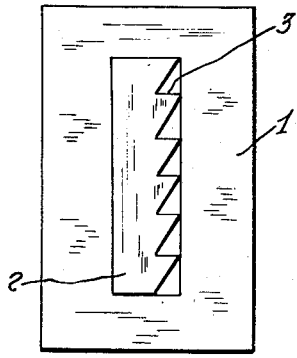
Figure 1 is a plan view of a saw-tooth die punch.
Figure 2:
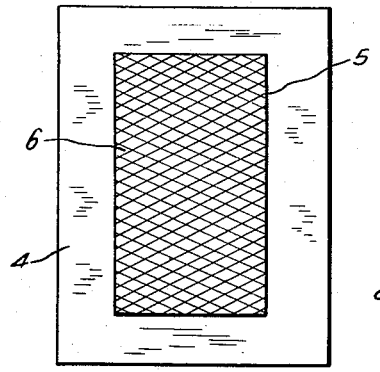
Figure 2 is a plan view of a file-tooth impressing die punch.

The die punch for the saw teeth shown in Figure 1 comprises a base block 1, the punch proper 2 and the saw-tooth conformation 3, all being merely outlined because otherwise of conventional design. The die punch for the file ridges shown in Figure 2 comprises a base block 4, the punch surface proper 5, which might feasibly be a section of a preformed cross-file, and has the intersecting ridges 6. Obviously, the straight-saw-teeth cutting edges illustrated in Figure 1 are variable to suit requirements, as are the ridges which compose the design of the exemplifying file-tooth punch.

Figure 3:
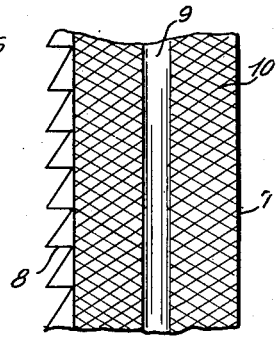
Figure 3 is a greatly enlarged, partially finished, plan view of a strip of the duplex and integrally combined band-saw and band-file, optionally provided with a longitudinally extending guide-groove.

In Figure 3 which illustrates my initial design of an endless band saw and band file combination as an integral structure (meeting ends of sections of chosen length being electrically butt-welded in a manner previously practiced) and as a duplex machining tool, the entire structure 7 comprises the reversely set edge teeth 8, longitudinally extending median groove 9 and file ridges 10, as exemplified adjacent to each side of the groove 9.

Figure 4:
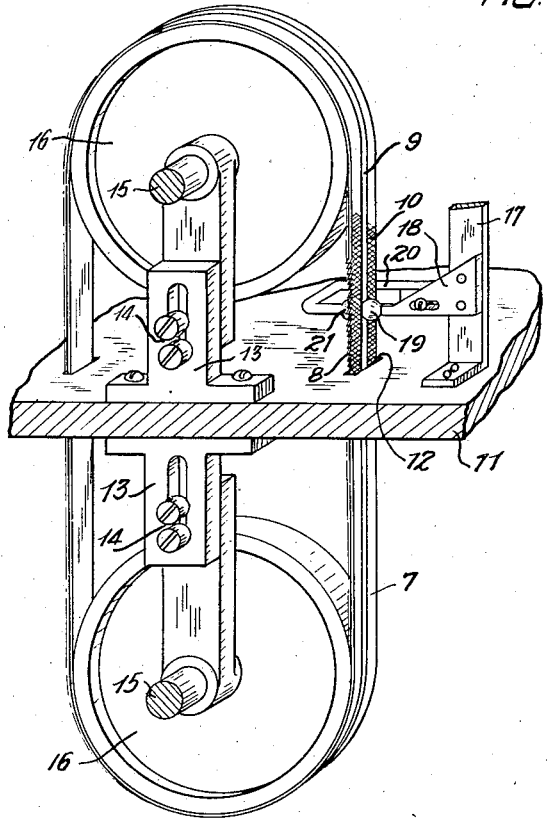
Figure 4 is a perspective view, merely in outline, of an apertured machine-tool table and supports for effecting the travel therethrough of an endless band-tool and of a guiding appliance for the tool, above the table.
Figure 5:
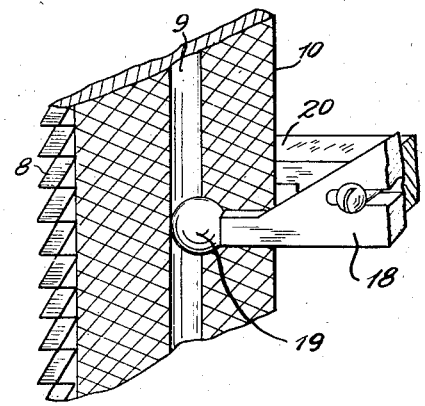
Figure 5 is an enlarged view of the horizontally adjustable guiding mechanism.

A machine tool illustrated in Figure 4 as suitable for the operating performance of my invention, includes a table 11 intended to support the work piece or blank. The table is provided with a vertically extending slot 12 through which the sawing and filing unit is to travel. A pair of brackets 13, upstanding and depending respectively from the table, each has adjustable connection at 14 with an arm which carries near its free end a shaft 15 on which is mounted a pulley 16 having a yielding peripheral covering to prevent band slip parallel with the axes of the pulleys. The brackets 13 and their arms being duplicated are given the same reference numeral. My endless tool is shown enveloping both pulleys 16 so as to be driven thereby in a manner unnecessary to be shown because old practice. Adjacent to the slot 12, the table supports an upright standard 17 which carries a lateral extension 18 having its extremity spherically shaped at 19 so as to be adapted to occupy the traveling groove 9 whereby to guide that side of the band or to delimit its vibration, or flipping action in one direction transverse relative to the direction of band travel. The extension 18 is itself provided with a bowed extension 20 which is horizontally adjustable (as indicated by the unnumbered set screws) and has its extremity fashioned as a contract finger 21 adapted oppositionally to guide or to delimit band action with reference to the approached slot 12, by its intermittent if not constant engagement with the opposite side of the band tool. Such guiding delimitation is required until a measure of sawing progress into the blank has occurred (somewhat prior to intersection of the roots of the teeth) after which such blank and tool intersection substitutionally serves the function of the initial finger guiding. Manifestly, that side of the band which has the file ridges might less satisfactorily have the latter undivided by absence of the groove because abrasion of the guide finger and wear of the file ridges would result. As a sufficiently satisfactory modification, a flat surface might alternatively there divide the file ridges. Moreover, if the groove 9 were in the opposite side of the band, the spherical end 19 should become transposed to the illustrated location of the contact finger 21. The provision of some adjustment for one or both guide fingers permits attainment of abrasion pressure of the file ridges to be exerted against an edge surface of a blank in the absence of a band-stabilizing confinement of the saw teeth and such pressure may be effected and maintained by means of the horizontal adjustment to any degree which experience shall have taught to be expedient, with consideration of the material of the blank, its thickness, the speed of the band, the delicacy of filing "finish" to be imparted or the length or flexibility of the band.

A series of adjoining, multiple-inch sections of a flexible band blank could be successively operated upon by punching out the interstices between the saw teeth and by punch-displacing the file ridges, correspondingly to increase the maximum thickness dimension of the band whereby it exceeds the width of the saw cut-out. A file tooth "set" of five-thousands of an inch (.005") and up is not uncommon. The middle groove for the guide finger might previously have been formed on the band blank or it might be impressed during the same operation that impresses the file teeth on each side thereof.

A skilled sawing operator using a magnifying glass can employ my invention so as nearly always to eliminate the marked micrometer-located line and so that very little filing is required, the amount, after due experience, reliably equalling the measure by which the file band thickness exceeds the width (either way of .04") of the kerf cut by the saw. Then no other lateral pressure is required. In other words, a good machinist soon learns to achieve that preferred performance in the great majority of jobs, which is to say, that he can so nearly saw-eliminate the micrometer-established severing line that he will leave a minimum bordering edge-excess or burr to be filed off and which can average, not to exceed .005" to .01". I have repeatedly saw-cut so closely that the depth of metal to be filed off is just the minute distance that the "set" of the file ridges has them project beyond the proximate plain side of the band. Therefore, the removal by filing of the correct amount is in effect automatic while the file portion of the tool follows the saw teeth into or across a blank. Consequently, with such foreknowledge, and skill the hazard of filing off too much is negligible. Contrary to expectation, no binding of my tool occurs although the file portion has a micrometer measurement of thickness in excess of the width of the saw kerf. It performs its double machining uniformly, steadily and smoothly.

It is noted that band saws operating on metal do not travel very fast (a minimum of about sixty feet per minute); also that they do not become hot (even without the usual air-blast provision); also, that the life of the saw teeth on, say, a ten foot band approximates the time required to saw-sever an aggregate of ten linear feet of saw cuts; and that the file teeth on a band will have longer life than the saw teeth regardless of the composition of the material being concurrently sawed and filed.

As contradistinguished from my reliably successful practice of just about completely cutting out the marked line (within .002" of the desired edge surface), the universal practice during the last decades has been comparatively expensive. For instance, a popular machine, adapted only alternatively and successively to employ both a band saw and a band file, has not expediently permitted sawing closer to the marked line than .01" and besides requiring the double time for resetting and succession of sawing and filing, has therefore had to file off much more material with added time consumed and attendant higher cost.

For many jobs a small blank is satisfactorily to be guidably moved, turned and held against the two distinct sets of teeth, manually, whereby simultaneously to perform two different machining operations; as exemplified, first to commerce to saw through the blank, progressively in one direction and then concurrently and progressively to abrade (file) along one of the consequent appositioned surfaces in a different direction and usually in an approximately transverse direction. However, for certain "quantity production" jobs, the relative movement sometimes required to effect pressure between the work and file band might be automatically accomplished and a relative movement in a plane intersected by the tool effected by spring pressure, be prescribed by some template actuator which is also adapted to maintain the required engaging pressure apart from a kerf, in substantially relatively transverse directions.

I would have it understood that my invention comprehends modified constructions and equivalent methods within the scope of the granted claims. The showing of the drawing and the specific descriptions thereof are merely exemplifications of a plurality of mechanical embodiments and arrangements and procedures.

For instance, it is mentioned that the size and shape of the saw teeth may be varied to suit the thickness and composition of the blank and that the design and coarseness of the file teeth may be likewise varied for best performance, as shall have been empirically determined. If both saw teeth and file ridges are to be formed by the stamping process, any standard type of punch press is readily adaptable and repeated operations are successively performed by it on adjoining linear sections of selectable extent along a band-blank of indeterminate length.

I claim:

1. An endless integral saw and file band formed with saw teeth along one edge and linear, crosswise extending file ridges along one side, said ridges being divided by a longitudinally extending smooth guide-area whereby said band is adapted to have its movement in one direction delimited by a suitably located guide finger.

2. A flexible metallic band having saw teeth along an edge and integrally provided with file teeth extending linearly crosswise of said band, the ends of said band being welded together.

3. An endless metal band integrally provided on one side with linear, parallelly extending groups of file teeth, said groups of file teeth being definitely separated in a direction crosswise of said band whereby said file-teeth-interjacent area is adapted for contact with the extremity of a guiding fixture.

4. A metallic, flexible, looped and endless band having a smooth middle area continuously there-around and integrally provided along a side with obliquely extending, linear file teeth, said smooth area being adapted for contact with the extremity of a guide finger.

5. A flexible, endless metal band having offset saw teeth along an edge and integrally provided on a side with file teeth extending linearly and obliquely crosswise and with their leading ends predeterminedly located with respect to an edge of said band, whereby to effect shearing abrasion in a width corresponding to the length of said file teeth simultaneously with the kerf cutting by said saw teeth.

6. An endless, flexible metallic band provided with saw teeth along an edge thereof and further provided along a side thereof with linear file teeth extending crosswise of said band, there being a longitudinally extending strip area continuously around the same side of the band and which area is recessed relative to the peaks of said file teeth adjacent thereto, said recess being adapted for contact with a guiding fixture.

7. An endless, integral file band formed with file ridges along a side, said ridges being longitudinally divided along the median line of said band to provide crosswise-separated rows of file ridges and a continuous recess whereby said band is adapted to have its movement in one direction delimited by a suitably located guide finger.

8. An endless, integral file band of thin, flexible steel and formed with cross-cut file teeth along one side, said band being formed at its middle with an endless, longitudinally extending groove adapted for confinement of the extremity of a guiding appliance.

HENRY TESTO.